H. J. LUNDQUIST.
SKEE SHAPING DEVICE.
APPLICATION FILED JAN. 12, 1920
1,356,726.   Patented Oct. 26, 1920.
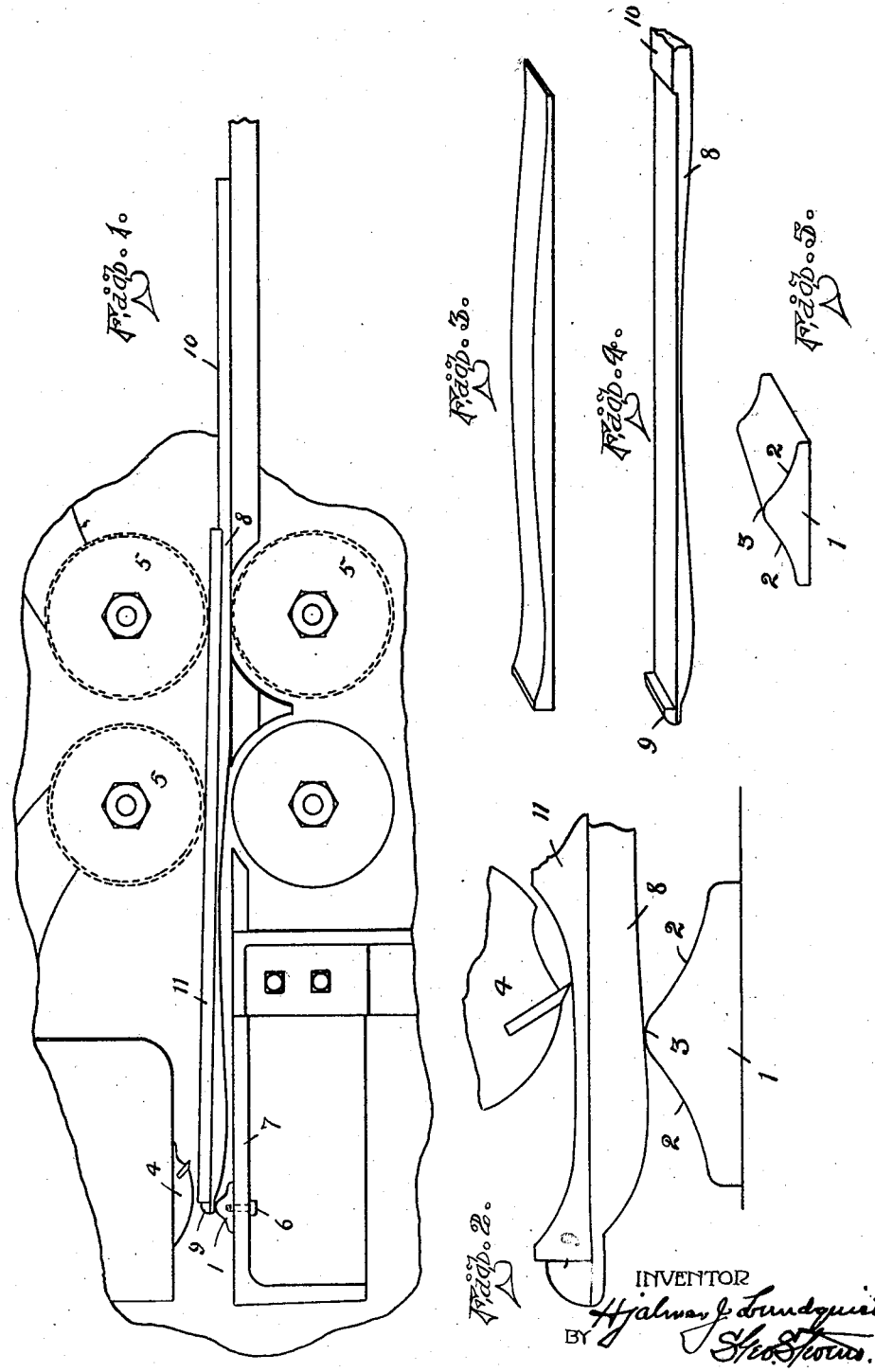

UNITED STATES PATENT OFFICE.

HJALMAR J. LUNDQUIST, OF DULUTH, MINNESOTA.

SKEE-SHAPING DEVICE.

1,356,726.  Specification of Letters Patent.  Patented Oct. 26, 1920.

Application filed January 12, 1920. Serial No. 350,975.

*To all whom it may concern:*

Be it known that I, HJALMAR J. LINDQUIST, a subject of the King of Sweden, residing at Duluth, in the county of St. Louis and State of Minnesota, have invented certain new and useful Improvements in Skee-Shaping Devices, of which the following is a specification, reference being had therein to the accompanying drawing.

This invention relates to shaping devices for use in connection with power molding machines and has special reference to such a device for shaping or forming the upper surface of skees, or the like, and also the method of accomplishing same.

The principal object of the invention is to provide means whereby skees or other pieces of wood may be uniformly shaped upon the upper surface thereof much more cheaply and rapidly than heretofore.

Other objects and advantages of the invention will appear in the further description thereof.

Referring to the accompanying drawing forming part of this application:

Figure 1 is a side elevation of the assembled coöperative parts of the device in position in a common molding machine and carrying a piece of stock material ready to be shaped by advancement through the machine.

Fig. 2 is a similar view of the same assemblage with the form or mold carrying the skee-stock advanced somewhat in the process of shaping.

Fig. 3 is a perspective view of the piece operated upon and after the upper surface has been completely shaped ready for completion into a skee.

Fig. 4 is a similar view of the form upon which the stock is carried when being shaped, and Fig. 5 is a perspective view of the pilot block.

Heretofore it has been the custom to form the curved upper surface of a skee by delineating same with the use of a templet upon the edge of the stock to be shaped, then sawing the piece thus marked with a hand saw.

After this shaping of the upper surface is accomplished the making of the skee is further continued by sharpening or pointing the forward end and permanently arching upwardly by steaming and bending in the ordinary manner.

In my improved method of shaping the upper surface of the skee I employ the pilot block 1 which in length is preferably the width of the skee or more, and in width approximately half its length. The two opposite halves of the upper portion of the block are cut away leaving a concave inclined surface 2 from each lower corner to the center of the block, viewing it transversely, the latter being convex and forming a central bead or ridge 3 the full length of the block.

This pilot block may be made of wood or metal as desired and is secured directly beneath the rotary cutting head 4 of the molding machine which latter may be of any type common in the art and having sets of feed rollers as indicated at 5. One or more tap bolts 6 are shown as convenient means for fastening the pilot block to the projecting bed 7 common to such machines.

8 represents the wooden form or mold which carries the piece of stock to be shaped, the under side or face being of the desired contour for shaping the stock though exactly the opposite to that eventually accomplished, that is to say, where the mold is concaved the stock will be convexed and vice versa as is evident.

At the front end of the mold is a straight forwardly projecting section 9 extending above the plane of the back of the mold and upon which the stock piece is carried forming a stop for the end of such piece when in place, it being substantially the same height above the back of the mold as the thickness of the piece being shaped. When the mold carrying the piece to be shaped is advanced under the cutting bead, this extension 9 will project over the central bead of the pilot piece and form no obstruction to the advancement of the mold. When in this position and the advancement of the mold continues it is evident that the latter will begin to rise in mounting the pilot which will bring the stock piece, which it carries, into contact with the cutter head and the process of shaping be begun. As the advancement of the mold continues which results automatically from the operation of the feed roller continuing to crowd the work to the cutter, the upper surface of the stock piece will be contoured in exact accord with the undulations of the under side of the mold as the latter passes over the pilot block. The carrying recess or space on the back of the mold terminates adjacent the rear end of the piece being shaped, the length of such being predetermined, and from which point rearwardly sufficient distance to insure the mold being carried far enough to complete its work by the action of the feed rollers thereupon, the mold is made the full thickness of the combined body portion and that of the last portion of the piece being shaped as at 10.

It is apparent that any modification of shape in the mold will result in a corresponding change of shape in the piece being operated upon and that many other shapes could be produced other than that employed for skees, for example a number of shorter pieces could be assembled in one form and the latter shaped beneath each piece to form each and every one alike as they are successively fed through the machine. The stock piece is shown at 11.

In practice, and which forms one feature of my present invention, is the utilization of a plurality of molds in the process of making the skees and which are used progressively, one person feeding one or more molds carrying a piece being shaped to the machine while another person receives them from the machine, removes the shaped pieces and passes back the molds to be refilled and fed through again. By this process and the employment of the combination above set forth it is found that many more skees may be shaped than by any other method known in the art.

What I claim is:

A carrying mold of the character described for making skees comprising a straight elongated form rectangular in cross-section throughout and having a cutaway portion in the upper side thereof adjacent one end, said cutaway portion being the length of the skee to be formed, the lower face of the form below the cutaway portion being of reverse contour to that of the upper face of the skee to be formed and the forward lower end of the form being straight for a distance greater longitudinally the form than the non-cutaway portion above said straight section, whereby a portion of the skee when being formed will not be cutaway.

In testimony whereof I hereunto affix my signature in the presence of two witnesses.

HJALMAR J. LUNDQUIST.

Witnesses:
M. W. DENHAM,
S. GEO. STEVENS.